US008571201B2

United States Patent
Coleman et al.

(10) Patent No.: US 8,571,201 B2
(45) Date of Patent: *Oct. 29, 2013

(54) CROSS CHANNEL IDENTIFICATION IN ELECTRONIC COMMERCE ENVIRONMENTS

(75) Inventors: Barry Gordon Coleman, San Jose, CA (US); Stephane Samuel Muszynski, Washington, DC (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/489,564

(22) Filed: Jun. 23, 2009

(65) Prior Publication Data

US 2010/0322404 A1    Dec. 23, 2010

(51) Int. Cl.
*H04M 3/00* (2006.01)

(52) U.S. Cl.
USPC .................................. 379/265.09; 379/93.12

(58) Field of Classification Search
USPC ............... 379/93.12, 93.23, 220.01, 265.09, 379/265.11; 709/203, 217, 218, 227
See application file for complete search history.

(56) References Cited

U.S. PATENT DOCUMENTS

| | | | |
|---|---|---|---|
| 5,528,678 A * | 6/1996 | Kaplan | 379/265.11 |
| 6,021,428 A * | 2/2000 | Miloslavsky | 709/206 |
| 6,707,811 B2 | 3/2004 | Greenberg et al. | |
| 6,791,974 B1 | 9/2004 | Greenberg | |
| 6,914,899 B2 | 7/2005 | Siegrist et al. | |
| 6,934,282 B1 * | 8/2005 | Yoon | 370/356 |
| 7,000,185 B1 | 2/2006 | Murren et al. | |
| 7,174,506 B1 | 2/2007 | Dunsmoir et al. | |
| 7,272,659 B2 | 9/2007 | Fukuoka | |
| 7,356,606 B2 | 4/2008 | Choate | |
| 7,519,902 B1 | 4/2009 | Kraft et al. | |
| 2002/0054126 A1 | 5/2002 | Gamon | |
| 2002/0198903 A1 | 12/2002 | Robison et al. | |
| 2003/0033227 A1 | 2/2003 | Heiser | |

(Continued)

FOREIGN PATENT DOCUMENTS

EP    0 843 454 A2    5/1998

OTHER PUBLICATIONS

"Co-Browse: Provide Online Visitors with Hands-On Assistance Whenever They Need It" date Unknown, Retrieved Apr. 2, 2007, http://www.liveperson.com/sb/cobrowse.asp.

(Continued)

*Primary Examiner* — Antim Shah
(74) *Attorney, Agent, or Firm* — Miles & Stockbridge P.C.

(57) ABSTRACT

A technique for providing context information for a PSTN phone call originating from an user includes dynamically selecting a phone number (or invite code or combination thereof) from among a pool of available phone numbers; displaying the selected phone number to the user in a web page; receiving context information corresponding to the user; receiving an incoming phone call on the dynamically selected phone number, connecting the incoming call to an outgoing call to the call center, and providing the context information to a computer corresponding to an agent to whom the outgoing call is connected. The context information may include a web page viewed by the user, and may be sufficient to provide a co-browsing capability. The technique may be utilized with or without session based web pages and may be performed by a sever that serves web page content to the user or a third party service provider.

21 Claims, 4 Drawing Sheets

(56) References Cited

U.S. PATENT DOCUMENTS

| | | |
|---|---|---|
| 2003/0083938 A1 | 5/2003 | Smith et al. |
| 2003/0093585 A1 | 5/2003 | Allan |
| 2003/0101412 A1 | 5/2003 | Eid |
| 2003/0110266 A1 | 6/2003 | Rollins et al. |
| 2003/0204753 A1 | 10/2003 | Raley et al. |
| 2004/0075686 A1 | 4/2004 | Watler et al. |
| 2004/0119727 A1 | 6/2004 | Dietz et al. |
| 2004/0201615 A1 | 10/2004 | Dietz et al. |
| 2004/0258089 A1 | 12/2004 | Derechin et al. |
| 2005/0044008 A1 | 2/2005 | Freishtat et al. |
| 2005/0162680 A1 | 7/2005 | Sekiguchi et al. |
| 2005/0198572 A1 | 9/2005 | Quiller et al. |
| 2005/0204281 A1 | 9/2005 | Choate |
| 2006/0010134 A1 | 1/2006 | Davis et al. |
| 2006/0053224 A1 | 3/2006 | Subramaniam |
| 2006/0179155 A1 | 8/2006 | Bunting et al. |
| 2007/0011337 A1* | 1/2007 | Brown et al. ............. 709/227 |
| 2007/0061412 A1 | 3/2007 | Karidi et al. |
| 2007/0061421 A1 | 3/2007 | Karidi |
| 2007/0061467 A1 | 3/2007 | Essey et al. |
| 2007/0078810 A1 | 4/2007 | Hackworth |
| 2007/0124290 A1* | 5/2007 | Swanson et al. ............. 707/3 |
| 2007/0156592 A1 | 7/2007 | Henderson |
| 2007/0160076 A1 | 7/2007 | Faber et al. |
| 2007/0186150 A1 | 8/2007 | Rao et al. |
| 2008/0109472 A1 | 5/2008 | Underwood et al. |
| 2008/0229233 A1 | 9/2008 | Blattner |
| 2008/0279353 A1* | 11/2008 | Schambach ............. 379/93.23 |
| 2008/0306794 A1 | 12/2008 | Cohen |
| 2008/0313306 A1 | 12/2008 | Skog |
| 2009/0024748 A1 | 1/2009 | Goldspink et al. |
| 2009/0106119 A1 | 4/2009 | Mathai et al. |

OTHER PUBLICATIONS

"Page Viewer: Tired of Guessing What Your Visitors are Looking At and Trying to Decipher Complex URLs?", date unknown, Retrieved Apr. 2, 2007, http://www.liveperson.com/sb/pageviewer.asp.

LivePerson: Engage Your Online Customers in Real Time, date unknown, Retrieved Apr. 2, 2007, http://www.liveperson.com/index.asp.

"LivePerson: About Us", date unknown, Retrieved Apr. 2, 2007, http://www.liveperson.com/about/.

Official Communication issued in the corresponding International Application No. PCT/US2010/039430, mailed on Feb. 8, 2011.

File History of U.S. Appl. No. 11/737,729 electronically captured from PAIR on Jun. 10, 2010.

File History of U.S. Appl. No. 11/863,175 electronically captured from PAIR on Jun. 10, 2010.

* cited by examiner

CROSS CHANNEL IDENTIFICATION IN ELECTRONIC COMMERCE ENVIRONMENTS

BACKGROUND

The use of the Internet has grown substantially over the last decade, and an important use of the Internet is electronic commerce, or e-commerce for short. One way in which e-commerce is conducted is through the provision of websites with web pages that contain information about products and services being offered for sale by a merchant. Such websites often provide for contact with a human being. For example, some websites allow a customer who may be reluctant to provide a credit card number online the option to purchase products and services via a PSTN (public switched telephone network) phone call to the merchant. Also, whether or not a web page offers the opportunity to make purchases, users of web pages often find themselves in situations in which human assistance is desirable. For example, a user may not be able to locate a desired product or service on a website, or may need information about such a product or service that is not available on the website even if the user has located a product or service on the website. A user may also encounter difficulty in navigating the website or in performing some action such as completing an on-line purchase. There are numerous other reasons why a user of a website may require human assistance.

There are many ways in which human assistance may be rendered to a web page user. These include establishing a chat connection with the user, establishing a VOIP call with the user, providing a "callback" to the user (which can be a PSTN callback or a VOIP callback, and can be immediate or at a time requested by the user), and simply providing a number which the user can dial to talk to a merchant call center.

When a user contacts a call center, it is desirable for the call center to have as much information about the user as possible. For example, when a known user calls a call center, the user's ANI (automatic number identification) or CallerID may be used to provide a "screen pop" of information about the known user on the computer display of the agent to whom the call is directed. This of course requires the call center to have a record of the user's phone number, and further requires the user to be calling from the particular phone line associated with that number. The ability to do a screen pop in the context of a call back is also desirable, and methods for accomplishing this are discussed in U.S. patent application Ser. No. 11/863,175, entitled "Method and Apparatus for Cross Channel Data Processing," the contents of which are hereby incorporated by reference herein.

It is also often desirable for an agent at a call center to be able to view a web page being viewed by a user when the need or desire for the human contact arose. Even more advantageous is the ability for a call center agent to be able to "push" web pages to the user's computer. This ability is sometimes referred to in the art as "co-browsing." The aforementioned application as well as U.S. patent application Ser. No. 11/737, 729, entitled "Method and Apparatus for JavaScript Co-Browsing," the entire contents of which are hereby incorporated by reference herein, disclose systems and methods for enabling co-browsing in the context of a callback.

The methods for providing context data (including data identifying the user, the user's computer and/or the web page being viewed by the user) discussed above do not work in all scenarios. For example, when a new user simply calls a telephone number associated with the website, or when an existing customer who has not logged on to a website calls from a telephone whose ANI/CallerID is not known to the call center or is blocked, there is no way for the call center to retrieve any context data for display to the agent.

DETAILED DESCRIPTION

Figure 1:
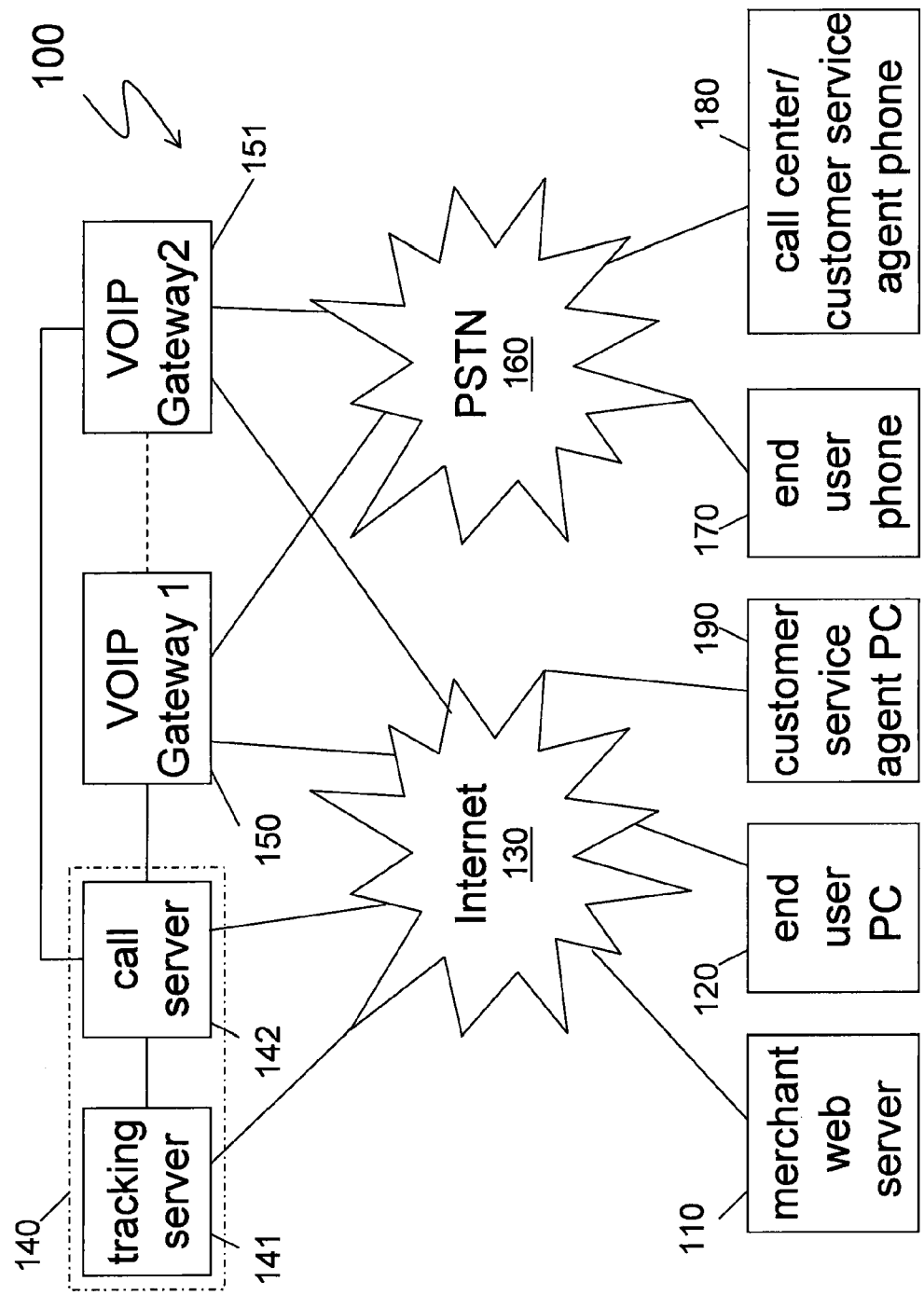
FIG. 1 is a block diagram of a system for cross channel identification according to an embodiment of the invention.

In the following detailed description, a plurality of specific details, such as types of context information and particular JavaScript commands for implementing various functions, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

The issues discussed above are addressed through the use of a dynamically allocated pool of PSTN telephone numbers (or dynamically allocated extensions or invite codes in combination with fixed or dynamically allocated phone numbers) that are displayed in web pages shown to the user and that are associated with web session identifiers or URL identifiers through which context information can be made available to agents in a call center. A PSTN phone number (and an extension or invite code in some embodiments) selected from the pool is assigned to a web session (or a particular web page) and is displayed to a user on a web page. When a user dials a telephone number displayed on the web page, the DID (direct inward dial) or DNIS (dialed number information service) (along with an extension or invite code entered by the user in some embodiments) associated with the incoming call is used to retrieve the associated web session or URL identifier. The web session or URL identifier is then used to retrieve context information from the web server such as the web page being viewed by the user or, for session based web pages, any user entered information (e.g., user name, user address, customer identifier associated with the user) or other information (e.g., mouse movements by the user, shopping cart contents, or browse history). The context information may be displayed on the screen of a call center agent's computer. Provisions for a co-browsing session may also be made. The aforementioned techniques can be used by a call center itself and in the context of a third party service provider. In the case of the latter, the dynamically allocated phone numbers may be associated with call center phone numbers or the phone numbers associated with the third party service provider or any other phone numbers.

In some embodiments, such as in the context of a service provider distinct from a host of a merchant website, a system and method performed by the service provider for providing context data to a call center for a PSTN phone call from a user having a user computer for viewing a website includes the steps of: receiving a request for a PSTN phone number and a web session identifier (the request and the web session identifier may be in the same or different messages); dynamically allocating a phone number from a pool of phone numbers (which may be associated with call center or the service provider or the website host) for the web session (the allocating step may be performed before or after the request and/or the web session identifier is/are received), receiving a request for a web session identifier and an phone number identifier (e.g., a DID or DNIS) of a PSTN telephone number associated with an incoming phone call; correlating the phone number identifier with the web session identifier; and transmitting the web session identifier in response to the request.

In some embodiments, a phone number from a pool of phone numbers is allocated to a new web session prior to or at the start of the session and remains associated with the web session for the duration of the session. In other embodiments, the phone number can be allocated when a user indicates a desire to place a call. For example, if a user is on a web page showing a product description and then presses a "Contact Us" link, the download request message from the user's browser to the server can include the URL or IP address of the web page. Upon receipt of the download request for the "Contact Us" web page at the web server, a phone number is allocated to the web page and is included in the web page or pop-up window transmitted to the user in response to the download request. This technique allows an incoming phone call on the allocated number to be associated with the web page from which the user pressed the "Contact Us" link and thus can be used to display a copy of the web page to a call center agent when the incoming call is routed to the agent.

There are several ways in which the phone numbers may be dynamically allocated, and the choice of a particular allocation scheme involves a tradeoff in cost versus specificity. In one embodiment, a phone number is dynamically allocated to a web session and is returned to the pool of unallocated telephone numbers after a predetermined period of time since the end of the web session. In other embodiments, the phone numbers are simply reused in sequence regardless of any time. Those of skill in the art will recognize that there are yet other ways in which the phone numbers may be dynamically allocated.

FIG. 1 illustrates a system 100 according to an embodiment of the present invention. The system 100 includes a merchant web server 110 to which an end user PC 120 equipped with a browser (e.g., Internet Explorer, Firefox, etc.) can connect via Internet 130 in order to locate information. Merchant web server 110 provides one or more web pages including at least one PSTN (public switched telephone network) telephone number that the end user may call to obtain additional information about the products and services described on the website associated with merchant web server 110. The end user may choose to call the phone number provided on merchant web server 110 over the PSTN 160 using end user phone 170 to contact a customer service agent in order to obtain the desired additional information and/or place an order for the products or services. The customer service agent may also have a phone 180 (it should be understood that the call center agent phone 180 can include a sophisticated phone call handling system including automatic call distributors, private branch exchanges, interactive voice response systems, and other devices which are well known in the art and will not be discussed in further detail herein) connectable to the PSTN 160.

Also connected to the Internet 130 are a tracking server 141 and a call server 142 (it should be understood that these two devices, which may be physical or logical, can be combined into a single integrated server 140 which performs the functions of both as described further herein; and that different allocations of functions between the call server and the tracking server are possible in alternative embodiments). In this embodiment, the tracking server 141 is responsible for maintaining the association between web session or URL identifiers and, in cobrowsing enabled embodiments, maintaining context information that will ultimately be provided to a call center agent's PC, while the call server 142 is primarily responsible for controlling a first VOIP (voice over internet protocol) gateway 150 and a second VOIP gateway 151 (two VOIP gateways are shown in FIG. 1, but additional VOIP gateways are present in other embodiments) to connect incoming calls from end users to a call center. The VOIP gateways, which are available from a variety of sources such as CISCO™, have the ability to convert a call from the PSTN (public switched telephone network) 160 to a VOIP (voice over Internet protocol) phone call. In some embodiments, the second leg of the call from the VOIP gateway to a call center will be made via the PSTN. In other embodiments, the second leg of the call will be made from a VOIP gateway 150, 151 directly to VOIP software application residing on the customer service agent PC 190 (in which case the call server 142 may determine the particular customer service agent PC 190 to which the call is routed, or the call server 142 may be instructed as to which particular customer service agent PC 190 to route the call). In still other embodiments, the second leg of the call will be made from a VOIP gateway 150, 151 to a centralized VOIP infrastructure at the call center, where it may remain in VOIP form when directed to a VOIP software application residing on the customer service agent PC 190 or directed to a VOIP-enabled telephone (not shown in FIG. 1) associated with the customer service agent, or may be converted to a standard telephone format by an internal device (e.g., a VOIP gateway) at the call center.

In those embodiments in which the call to the call center is to be a PSTN call, the call server 142 controls the VOIP gateways 150, 151 such that when an incoming PSTN call is received via the first VOIP gateway 150, the call server 142 determines the DID (direct inward dialing) number representing the phone number dialed by the calling party (which is dynamically allocated by the call server 142 as discussed in further detail below), determines a PSTN telephone number of a call center to which the incoming call should be directed, controls the second VOIP gateway 150 to place an outbound PSTN call to the PSTN telephone number determined in the previous step (which may include an ANI or CallerID that can be used by the call center to request context information about the call), and bridges the outbound call to the inbound call by connecting the VOIP input of one gateway to the VOIP output of the other gateway and vice versa as illustrated symbolically in FIG. 1 by the dashed line between gateways 150, 151. Although VOIP gateways 150, 151 are illustrated in the embodiment of FIG. 1, it should be understood that any PSTN call switching equipment that is capable of receiving an incoming PSTN call on one telephone number and redirecting the call to a second PSTN telephone number may be used in place of the VOIP gateways 150, 151 (e.g., a personal branch exchange with remote call forwarding capability), and that the destination could go directly to the desired location skipping remote call forwarding entirely.

Figure 2:
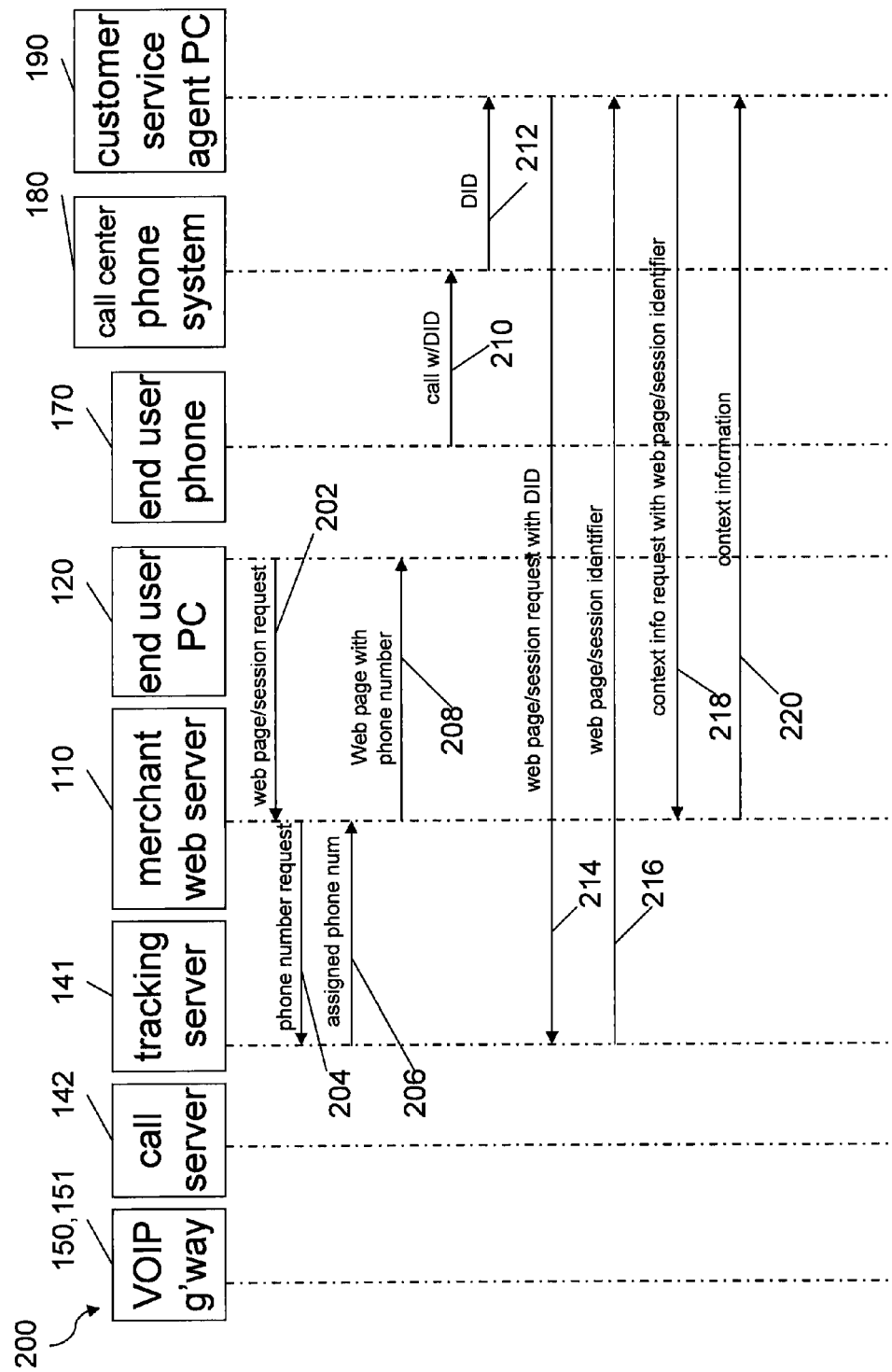
FIG. 2 is message flow diagram according to an embodiment of the invention.

Operation of the system 100 of FIG. 1 in one embodiment will now be discussed with reference to the message flow diagram of FIG. 2 that illustrates the flow of messages and data between various entities in FIG. 1. The embodiment of FIG. 2 is a relatively simpler version of a cross channel technique applicable in the context of a third party service provider that manages the associations of the dynamically allocated PSTN phone numbers with web session IDs and/or web page identifiers such as URLs or IP addresses.

The process begins when an end user at end user PC 120 clicks on a link or enters a URL associated with web page, either session or non-session based. The browser on the end user PC 120 sends a download request message 202 for the web page to the merchant web server 110. This request message 202 includes a web session ID, a web page from which the user has viewed a phone number to contact the merchant, or other information as discussed above that can be used to provide context information to a call center agent. The merchant sever 110 sends a message 204 requesting a phone number to the tracking server 141. The tracking server 141 dynamically allocates a phone number from among the pool of phone numbers, records the dynamically allocated phone number and the corresponding web session ID or web page identifier (e.g., URL or IP address), and sends a reply message 206 to the web merchant server 110 with the dynamically allocated phone number (as discussed above, this phone number can include an extension to be dialed by the end user).

The merchant web server 100 inserts the phone number from the message 206 into a web page or other document or file and serves the web page to the end user PC 120 in a message 208. The browser at the end user PC 120 then renders the web page or other document/file to the user. The user then initiates a phone call from his end user phone 170 to the dynamically allocated number. The phone call is received at the call center and is routed to an agent telephone 180. The call center phone system provides the DID (or DNIS and/or extension dialed by the end user) to the customer service agent PC 190 in a message 212. The customer service agent PC 190 then sends a message 214 including the DID (or DNIS and/or extension dialed by the end user) to the tracking server 141 requesting the web session ID or web page identifier. The tracking server 141 responds with a message 216 including the web session ID or web page identifier associated with the previously allocated DID (or DNIS and/or extension dialed by the end user) from the previous message 214. The customer service agent PC 190 then sends a message 218, including the web session ID or the web page identifier, to the merchant web server 110 to request context information. The merchant web server 110 replies with a message 220 that includes the desired context information. The context information can be any of the context information discussed above.

As previously mentioned, the foregoing embodiment illustrates a third party service provider scenario. Those of skill in the art will recognize that the same techniques may be employed by the web merchant server with minor modification. For example, the merchant web server 110 may perform the functions performed by the tracking server 141, in which case messages 204 and 206 would be eliminated and messages 214 and 216 would be received by and transmitted from the merchant web server 110 rather than the tracking server 141. Furthermore, the process above involves end user calls directly to call center telephone lines, but the end user calls may also be directed initially to third party phone lines as discussed below in connection with FIG. 3. Other variations and functional allocations are also possible.

Figure 3:
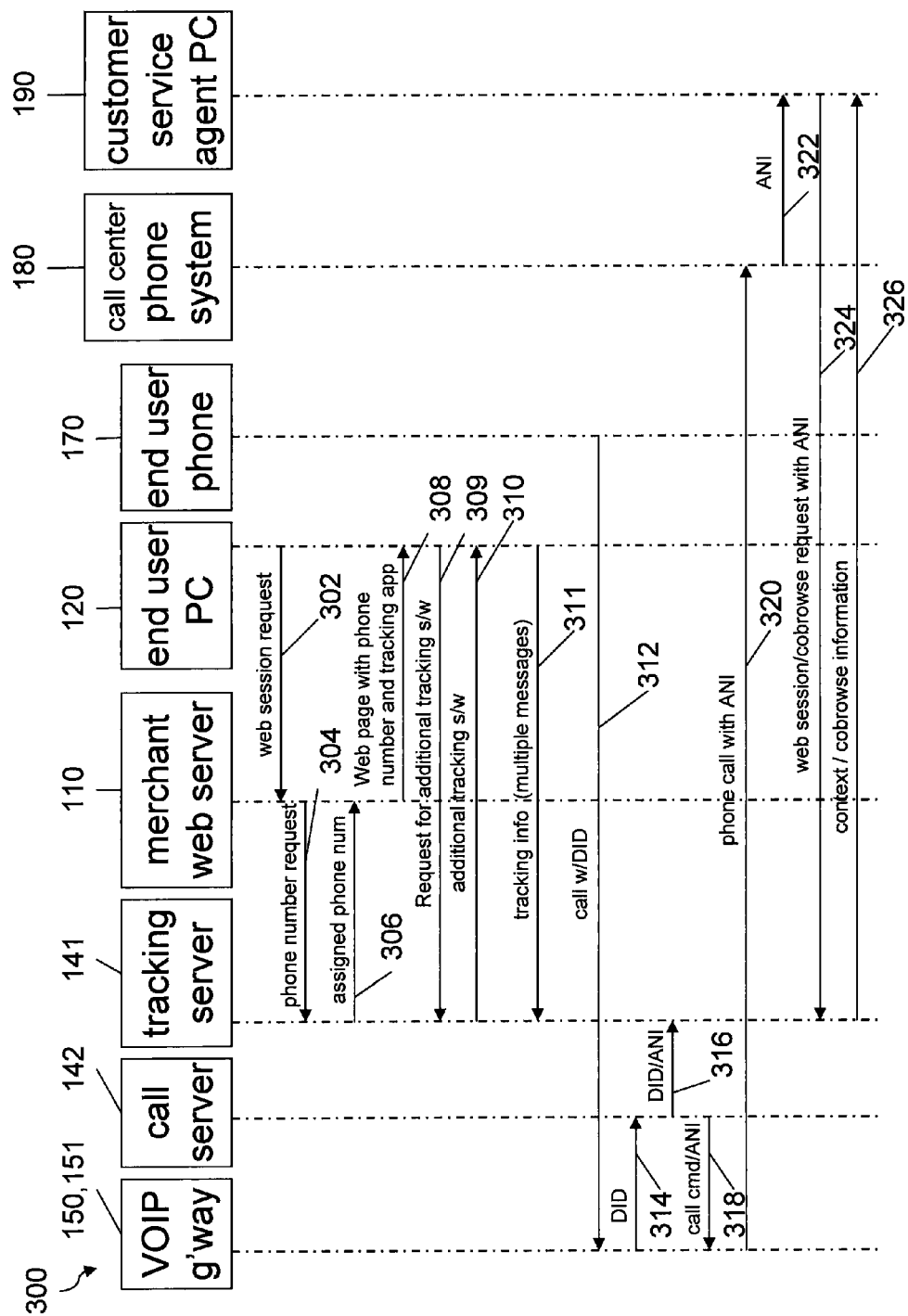
FIG. 3 is a message flow diagram according to another embodiment of the invention.

Operation of the system 100 according to a second embodiment is illustrated in the message flow diagram 300 of FIG. 3. This embodiment is illustrative of a third party service provider scenario in which the third party service provider provides a cobrowse capability and on which phone calls are received on the third party service provider's phone lines and forwarded to a merchant call center. The cobrowse capability discussed below is of a type employing hidden I-frames as described in co-pending and commonly owned U.S. patent application Ser. No. 11/737,729 entitled "Method and Apparatus for Web Page Co-Browsing." Those of skill in the art will recognize that other techniques for enabling co-browsing or simply passing context information are also available, such as XML HTTP requests (XHR). This method of FIG. 3 will be discussed in the context of a session-based web page but is also applicable to a non-session based or static web page.

The process begins with a download request message 302 from the end user PC 120 to the merchant web server 110 at the start of a web session. In response to the message 302, the merchant web sever 110 sends a message 304 to tracking server 141 in order to obtain a phone number to be used with the web session. The tracking server 141 responds with a message 306 including the phone number. The merchant web server 110 then sends a message 308 (which may be multiple messages) with the web page, a phone number and a single (preferably JavaScript) command that will initiate a request 309 that will initiate a download 310 of additional JavaScript code from the tracking server 141 to facilitate the collection of web session tracking information as described in the aforementioned U.S. patent application. As the end user's web session continues, one or more tracking messages 311 are sent to the tracking server 141. The tracking server 141 may assign a web session identifier to identify the web session, and this web session identifier may be the same as or different from the web session identifier assigned by the merchant web server 110.

At a point in which the user desires to place a phone call to the phone number supplied in the message 308 and displayed in the web session, the end user places a phone call 312 from the end user phone 170 to the VOIP gateway 150, 151 (the VOIP gateways 150, 151 are illustrated in FIG. 3 as a single entity but may be logically and/or physically separate devices as discussed above in connection with FIG. 1). The VOIP gateway 150, 151 sends a report 314 with the DID and the ANI (if available and valid) of the end user phone 170 from the phone call 312 to the call server 142.

The call server 142 then determines the content of the ANI to be signaled for the outbound call 320 to the call center. If the ANI from the incoming call 312 is available and valid, the call server 142 will select that ANI as the ANI to be signaled for the outbound call 320 to the call center. The selection of the inbound call ANI for the outbound call 320 to the call center provides the call center with the ability to retrieve any information associated with the ANI from the inbound call 312 that the call center may have. If the ANI from the inbound call 312 is not available or invalid, the call server 142 selects a different ANI for the outbound call. This different ANI may be the ANI associated with the actual line on which the outbound call to the call center will be placed, or may be a special code that signals to the call center that the ANI associated with the inbound call 312 is unavailable. An example of such a special code is an ANI associated with an invalid phone number (e.g., a phone number in which the exchange digits [digits 4-6 in a 10 digit U.S. telephone number including an area code] are 555). In still other embodiments, the different ANI corresponds to the DID of the incoming call 312.

Once the ANI has been selected, the call server 142 then sends a message 316 to the tracking server 141 reporting the DID along with the selected ANI for the outgoing phone call to the call center on which the incoming call 312 from the end user will be bridged. The call server 142 then sends a command 318 to the VOIP gateway 150, 151 to place an outbound call with the ANI from message 318 to the call center phone system 180 associated with the merchant. Those of skill in the art will recognize that the outgoing call may be placed on the actual phone line associated with the ANI or that the outgoing call may be placed on a different line with the ANI assigned by the call server "spoofed." The VOIP gateway 150, 151 places the outgoing phone call 320 to the call center phone system 180 and bridges it to the incoming phone call 312 from the end user.

When the call center phone system 180 receives the call 320, it routes it to a customer agent phone at the call center and sends a message 322 to the customer service agent PC 190 with the ANI of the incoming call. The customer service agent PC 190 then retrieves any available information associated with the ANI and sends a request 324 including the ANI to the tracking server 141. (In some embodiments, the call 320 from the VOIP gateway 150, 151 is made to a special number assigned by the call center to handle only calls from the VOIP gateways 150, 151, which indicates to the call center that context information may be available for the call 320). The tracking server 141 uses the ANI to determine the DID associated with it (as reported in message 316), and in turn uses the DID (which identifies the phone number assigned to the web session) as in index to retrieve the associated web session identifier, uses the web session identifier to retrieve context information and sends one or more messages 326 including context information back to the customer service agent PC 190. Those of skill in the art will recognize that tracking server 141 may have previously associated the ANI with the DID upon receipt of message 316 from the call server 142 such that the ANI may be used to directly determine web session identifier upon receipt of the request 424. This context information can include full co-browse session or any of the other information discussed above.

Figure 4:
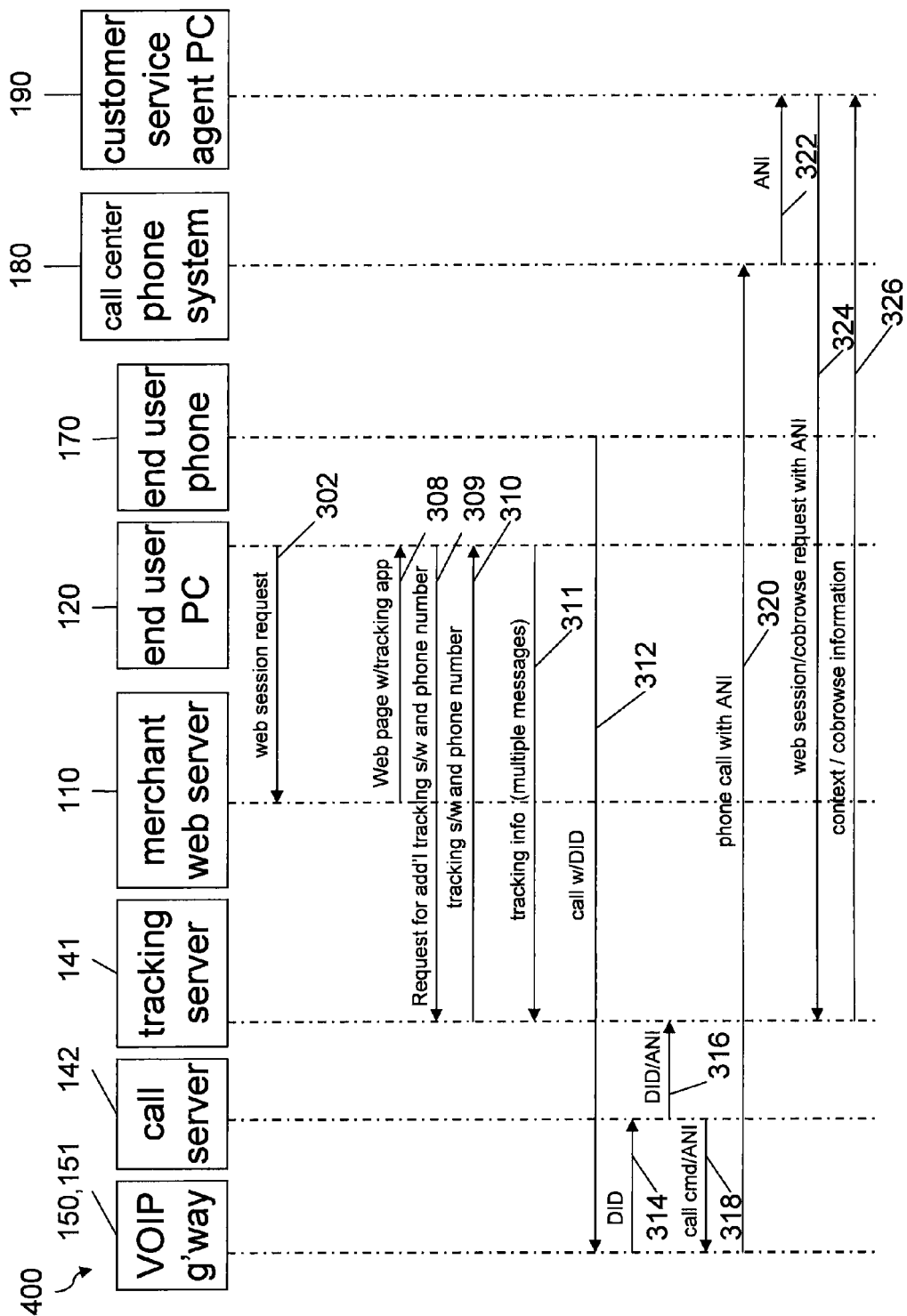
FIG. 4 is a message flow diagram according to still another embodiment of the invention.

Many modifications to the technique discussed above in connection with FIG. 3 are possible. For example, XHRs rather than hidden I-frames could be used to provide for a co-browsing capability. As another example, rather than the request for a phone number being made by the merchant web server 110 to the tracking server 141 in message 304 and the phone number being placed in the web page by the merchant server 110, the tracking code placed into the web page for download to the end user PC 120 by the merchant server 110 causes the end user PC 120 to send a message to the tracking server 141 (or the call server 142) requesting a telephone number (this may be the same message 309 that requests the download of the additional tracking software) and then causes the browser at end user PC 120 to render the telephone number received from the tracking server 141 (or the call server 142) to the user along with the other portions of the web page upon receipt of the phone number from the tracking server 141 (or call server 142)(those of skill in the art will recognize that there are many different ways in which a web page from a merchant server may include a place holder for display of a phone number received from a third party server). Such an embodiment is shown in FIG. 4, which eliminates steps 304 and 306 from FIG. 3, modifies message 309 to further include a request for a phone number along with the request for additional tracking software and modifies the download 310 to include a phone number along with the tracking software (again, the request 309 and download 310 may actually occur in a series of messages; for example, the phone number may be downloaded several times when different web pages are downloaded from the merchant web server 110 and rendered to the user, or the tracking software may make a separate request for the phone number from the tracker server 141 (or call server 142)). In embodiments in which the end user PC 120 requests the phone number from the call server 142, the call server 142 may automatically notify the tracking server of the web session identifier or IP address from which the request was received so that tracking server 141 can maintain the associated between the end user PC 120 and the corresponding DID.

Still other modifications to the embodiment of FIG. 3 are possible. In some alternative embodiments, the outbound PSTN phone call 320 is replaced by a VOIP phone call. In such embodiments, a single VOIP gateway 150 may be configured to transition the incoming phone call 312 to a VOIP phone call directed toward a VOIP software application on the customer service agent PC 190, or to a central VOIP infrastructure in the call center or to a VOIP-enabled phone associated with the customer service agent. In such embodiments, the DID and ANI associated with the incoming call 312 are included in one or more packets sent from the VOIP gateway 150.

Yet another modification in some embodiments involves the use of extensions or invite codes in place of, or in addition to, the dynamically allocated phone numbers discussed above. As used herein, an "invite code" means any code that a user making a PSTN phone call enters via his or her telephone key pad in response to a prompt, which is typically made shortly after the phone call 312 initially completes. In some of these embodiments, a single telephone number is used and only invite codes are dynamically allocated. In other embodiments, a combination of different telephone numbers and invite codes are used (e.g., a single phone number can be used for each different merchant web server 110 and pools of extensions may be maintained for each merchant web server 110/phone number pair). In such embodiments, both a telephone number and an invite code (which may be labeled as an extension) are included in the message 306 and included in the web page 308 and used by the tracking server 142 as an index to the context information. When the end user places the call 312, the VOIP gateway 150, 151 prompts the user to enter the invite code (e.g., "please enter the four digit extension number now"). The code entered by the user is then included with the DID reported to the call server 142 in the message 314. An incoming phone call for which dials a phone number to initiate the call and then enters an invite code after the call initially completes will be referred to herein as corresponding to the phone number and invite code entered by the user (a phone call not involving any invite code is also referred to herein as corresponding to the phone number dialed by the user).

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computerized method for providing context information, the method comprising:
   receiving an indication from a user on a web page during a
      web session that the user desires to place a call;

in response to the receiving, selecting a first public switched telephone network (PSTN) telephone number from among a pool of PSTN telephone numbers;

associating the first PSTN telephone number with a web session identifier for the web session and the web page, wherein the first PSTN telephone number is displayed to the user during the web session;

receiving an incoming PSTN phone call corresponding to the first PSTN telephone number from the user;

determining the web session identifier and the web page associated with the first PSTN telephone number;

directing the incoming PSTN phone call to a second person, wherein the directing comprises determining a second PSTN telephone number associated with the second person, generating an outbound call to the second PSTN telephone number, and bridging the incoming PSTN phone call to the outbound call;

retrieving context information using the web session identifier; and providing the context information and co-browsing capability between a first computer corresponding to the user and a second computer corresponding to the second person to the second person after determining the second PSTN telephone number;

wherein the second PSTN telephone number is determined after the first PSTN telephone number is displayed to the user during the web session and after the incoming PSTN phone call is received.

2. The method of claim 1, wherein the context information includes an identifier of a web page being displayed to the user when an indication that a PSTN phone call is desired is received.

3. The method of claim 1, wherein the context information includes an identifier of the user.

4. The method of claim 3, wherein the identifier is entered by the user during the web session.

5. The method of claim 1, wherein the web session identifier identifies a web session at a server from which the web page is downloaded.

6. The method of claim 1, wherein the context information is retrieved from a server different from a server from which the web page was downloaded.

7. The method of claim 1, wherein the first PSTN telephone number includes an invite code.

8. A computerized method for providing context information, the method comprising:

receiving a request from an end user computer from a web page during a web session that an end user desires to place a call, the request received at a first server;

in response to the receiving, dynamically allocating a first PSTN telephone number from a pool of PSTN telephone numbers, the first PSTN telephone number being usable for placing a PSTN phone call;

associating the first PSTN telephone number with a web session identifier for the web session and the web page;

transmitting, in response to the request, the first PSTN telephone number to the end user computer for display to the end user associated with the end user computer during the web session;

receiving an incoming PSTN phone call corresponding to the first PSTN telephone number from the end user;

connecting the incoming PSTN phone call to an outgoing PSTN phone call to a second person, wherein the connecting comprises determining a second PSTN telephone number associated with the second person, generating an outbound call to the second PSTN telephone number, and bridging the incoming PSTN phone call to the outbound call;

determining the web session identifier and the web page associated with the first PSTN telephone number, wherein the determining the second PSTN telephone number is based at least in part on a direct inward dialing of the incoming PSTN phone call; and transmitting context information corresponding to the end user to a second computer associated with the second person and enabling co-browsing between the end user computer and the second computer after determining the second PSTN telephone number;

wherein the second PSTN telephone number is determined after the first PSTN telephone number is displayed to the user during the web session and after the incoming PSTN phone call is received.

9. The method of claim 8, further comprising the steps of:

transmitting tracking software to the end user computer from the first server, the tracking software being operable to cause the end user computer to transmit context information to the first server.

10. The method of claim 8, wherein the context information comprises information entered by the end user at the end user computer.

11. The method of claim 8, wherein the context information comprises an identifier of a web page viewed by the user at the end user computer.

12. The method of claim 11, wherein the identifier is a uniform resource locator.

13. The method of claim 12, wherein the first PSTN telephone number includes an invite code.

14. A system for providing context information to a call center, the system comprising:

a PSTN call switching device connectable to the PSTN; and a server connected to the PSTN call switching device;

wherein the server is configured to perform the steps of dynamically selecting a first PSTN telephone number from among a pool of available telephone numbers in response to receiving a request from an end user computer from a web page during a web session that an end user desires to place a call;

associating the first PSTN telephone number with a web session identifier for the web session and the web page;

transmitting the first PSTN telephone number for display on the end user computer associated with the end user during the web session;

receiving context information corresponding to the end user computer;

receiving a notification of an incoming phone call corresponding to the first PSTN telephone number on the PSTN call switching device;

directing the PSTN call switching device to connect the incoming phone call to an outgoing call to a call center, wherein the directing comprises determining a second PSTN telephone number associated with the call center, generating an outbound call to the second PSTN telephone number, and bridging the incoming PSTN phone call to the outbound call;

and providing the context information to a second computer associated with the call center and enabling co-browsing between the end user computer and the second computer after determining the second PSTN telephone number;

wherein the second PSTN telephone number is determined after the first PSTN telephone number is displayed to the user during the web session and after the incoming phone call is received.

15. The system of claim 14, wherein the first PSTN telephone number is transmitted in a message addressed to the end user computer.

16. The system of claim 15, wherein the context information corresponding to the end user computer is received from the end user computer.

17. The system of claim 15, wherein server is configured to transmit the first PSTN telephone number to the end user computer in response to a request from the end user computer.

18. The system of claim 14, wherein the PSTN call switching device comprises a first VOIP (voice over internet protocol) gateway connected to a second VOIP gateway, the first VOIP gateway having an input connected to an output of the second VOIP gateway, and the first VOIP gateway having an output connected to an input of the second VOIP gateway.

19. The system of claim 14, wherein the server is configured to receive a request for the context information from the second computer, the request for context information containing an identifier corresponding to a PSTN telephone number associated with the outgoing call.

20. The system of claim 14, wherein the wherein the phone number is transmitted in a message addressed to a second server, the second server being configured to include the telephone number in a web page downloaded to the end user computer.

21. The system of claim 14, wherein the first PSTN telephone number includes an invite code.

* * * * *